United States Patent
Srinivasan et al.

(10) Patent No.: US 10,992,773 B2
(45) Date of Patent: Apr. 27, 2021

(54) ACTION PROMPT TRANSMISSION BASED ON ATTRIBUTE AFFINITY

(71) Applicant: Microsoft Technology Licensing, LLC, Redmond, WA (US)

(72) Inventors: Hari Srinivasan, Palo Alto, CA (US); Salman Ahmed, Campbell, CA (US); Victor Louis Kabdebon, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/798,058

(22) Filed: Oct. 30, 2017

(65) Prior Publication Data

US 2019/0132416 A1  May 2, 2019

(51) Int. Cl.
| | |
|---|---|
| *H04L 29/08* | (2006.01) |
| *G06F 16/9536* | (2019.01) |
| *H04L 12/58* | (2006.01) |
| *G06Q 50/00* | (2012.01) |
| *G06F 3/0484* | (2013.01) |
| *G06N 20/00* | (2019.01) |
| *G06F 16/27* | (2019.01) |

(52) U.S. Cl.
CPC ........ *H04L 67/306* (2013.01); *G06F 16/9536* (2019.01); *H04L 67/36* (2013.01); *G06F 3/04842* (2013.01); *G06F 16/27* (2019.01); *G06N 20/00* (2019.01); *G06Q 50/01* (2013.01); *H04L 51/32* (2013.01); *H04L 67/22* (2013.01)

(58) Field of Classification Search
CPC .......... G06F 17/20; G06F 17/30; G06F 16/20; G06F 16/30; G06F 3/04; G06F 16/95; G06F 3/048; G06F 16/9536; G06F 16/27; G06F 3/04842; G06Q 50/01; H04L 67/306; H04L 67/36; H04L 51/32; H04L 67/22; G06N 20/00
See application file for complete search history.

(56) References Cited

U.S. PATENT DOCUMENTS

| | | | |
|---|---|---|---|
| 2013/0013700 A1* | 1/2013 | Sittig | G06Q 10/10 709/206 |
| 2014/0032659 A1* | 1/2014 | Marini | H04L 51/32 709/204 |

(Continued)

*Primary Examiner* — Sanchita Roy
(74) *Attorney, Agent, or Firm* — Schwegman Lundberg & Woessner, P.A.

(57) ABSTRACT

Techniques for generating and transmitting actions prompts based on attribute affinity between users of a social networking service are disclosed herein. In some embodiments, a method comprises: determining a first set of attributes of a first profile of a first user; determining a second set of attributes of a second profile of a second user; selecting action prompts based on corresponding criteria of the action prompts being satisfied by the first set of attributes and the second set of attributes; generating a first ranking of the action prompts for a first presentation channel based on a first ranking model; generating a second ranking of the action prompts for a second presentation channel based on a second ranking model; selecting at least one of the action prompts based on the first ranking; and displaying the selected action prompt(s) on a computing device of the first user via the first presentation channel.

18 Claims, 10 Drawing Sheets

(56) References Cited

U.S. PATENT DOCUMENTS

| | | | | |
|---|---|---|---|---|
| 2014/0156566 A1* | 6/2014 | Kabiljo | ............... | G06Q 30/02 |
| | | | | 706/12 |
| 2014/0229862 A1* | 8/2014 | St. Clair | ............... | H04L 51/32 |
| | | | | 715/753 |
| 2015/0185995 A1* | 7/2015 | Shoemaker | ........... | G06F 3/0484 |
| | | | | 715/708 |

* cited by examiner

MY NETWORK   JOBS   MESSAGING   NOTIFICATIONS

JOHN DOE
SOFTWARE ENGINEER AT LINKEDIN
UNIVERSITY OF WASHINGTON
SAN FRANCISCO BAY AREA

EXPERIENCE

SENIOR SOFTWARE ENGINEER
LINKEDIN
SEP 2015 – OCT 2017
SUNNYVALE, CA

SOFT...
ACME...
JUN 2...

> YOU AND JOHN DOE BOTH STUDIED COMPUTER SCIENCE AT THE UNIVERSITY OF WASHINGTON AND WORK AT LINKEDIN.
>
> CONNECT WITH JOHN DOE.
>
> [ CONNECT ]

EDUCATION

UNIVE...
BACH...
2005-2009

SMALLVILLE HIGH SCHOOL
2001-2005
ACTIVITIES AND SOCIETIES: MATH TEAM, SWIMMING, SOCCER

FEATURED SKILLS AND ENDORSEMENTS

JAVA – 33

JAVASCRIPT – 30

SOFTWARE DEVELOPMENT – 19

WEB DEVELOPMENT – 10

*FIG. 8*

ACTION PROMPT TRANSMISSION BASED ON ATTRIBUTE AFFINITY

TECHNICAL FIELD

The present application relates generally to generating action prompts and, in one specific example, to methods and systems of generating action prompts based on machine-learned attribute affinity between different users of a social networking service.

BACKGROUND

Online services, such as social networking services, often suffer from inefficient and unsuccessful prompting of users to take action via the online service. As a result, the online services waste electronic resources when generating these prompts, such as by consuming processing power during generation, as well as when transmitting these prompts, such as by consuming bandwidth during transmission.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 8 illustrates a GUI in which an action prompt is displayed on a profile page of a user of a social networking service, in accordance with an example embodiment.

DETAILED DESCRIPTION

Figure 1:
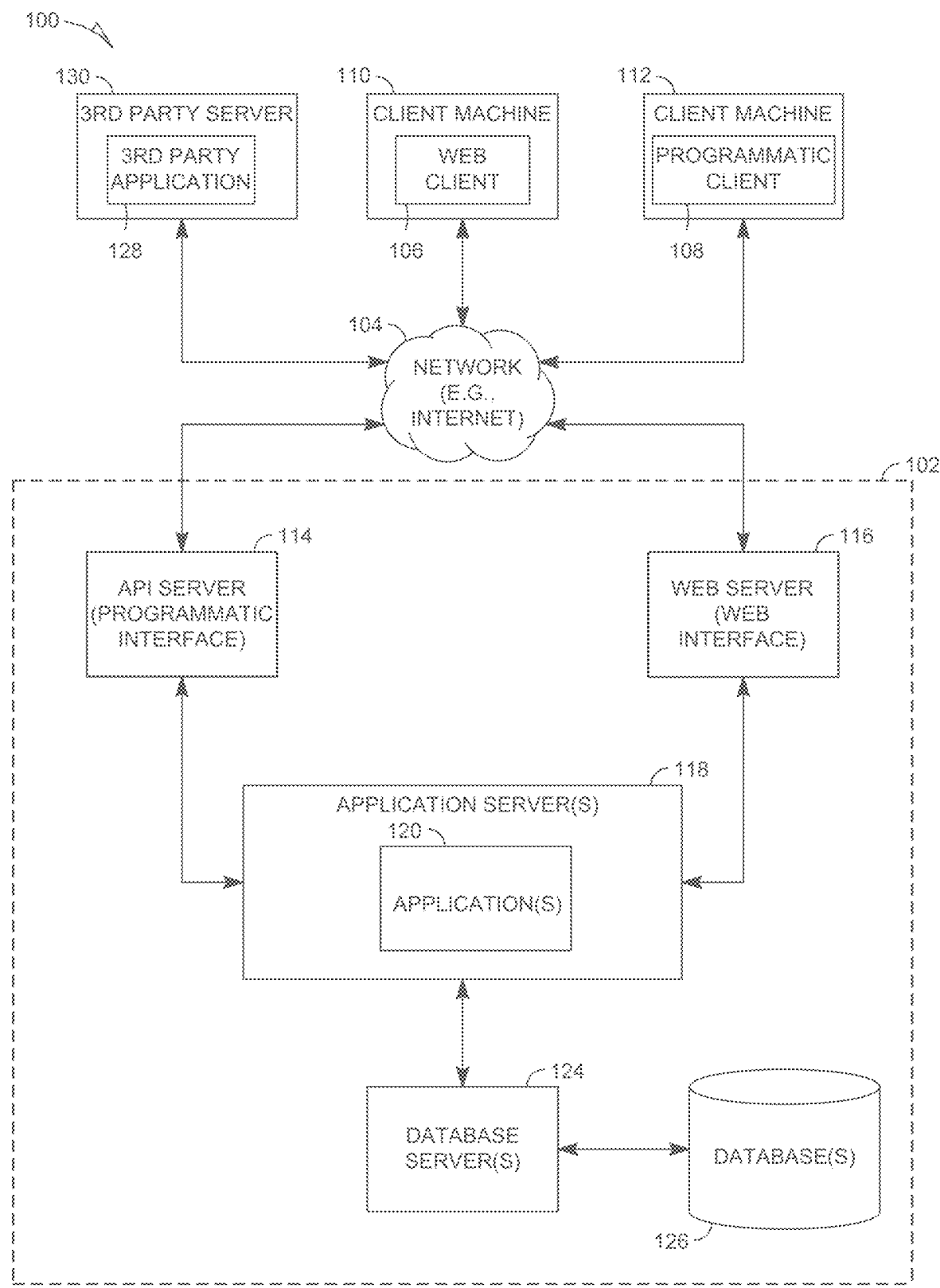
FIG. 1 is a block diagram illustrating a client-server system, in accordance with an example embodiment.

Example methods and systems of generating action prompts based on attribute affinity between different users of a social networking service are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to reduce the consumption of electronic resources associated with generating and transmitting action prompts. For example, the system and method of the present disclosure may reduce the consumption of processing power associated with generating action prompts that will not be acted upon by the user to whom they are directed, and may reduce the consumption of bandwidth associated with transmitting such action prompts to the user. Additionally, other technical effects will be apparent from this disclosure as well.

In some example embodiments, a computer system provides targeted, real-time, multi-channel action prompts to a member, or other user, of a social networking service based on a comparison of the attributes in the profiles of that member and another member. Such action prompts may be generated and presented to the member in response to, or otherwise based on, the member accessing digital content associated with the other member. For example, the computer system may, in response to detecting that the member is viewing a profile page of the other member, generate and display an action prompt to the member viewing the profile page, prompting the member who is viewing the profile page to perform a certain action with respect to the other member (e.g., send a message to or connect with the other member). The generation and transmission of such action prompts may be based on corresponding criteria of the action prompt being satisfied by the attributes of both members, such as a minimum threshold level of similarity between the attributes of both members being satisfied (e.g., a requirement that both members have attended the same university and are currently working in the same industry in the same state).

In some example embodiments, operations are performed by a computer system (or other machine) having a memory and at least one hardware processor, with the operations comprising: determining a first set of one or more attributes of a first profile of a first user of a social networking service; determining a second set of one or more attributes of a second profile of a second user of the social networking service; selecting a plurality of action prompts from a database of action prompts based on, for each one of the plurality of action prompts, corresponding criteria of the action prompt being satisfied by the first set of one or more attributes and the second set of one or more attributes, each one of the plurality of actions prompts comprising a selectable option for the first user to interact with the second user via the social networking service; generating a first ranking of the plurality of action prompts for a first presentation channel based on a first ranking model for the first presentation channel; generating a second ranking of the plurality of action prompts for a second presentation channel based on a second ranking model for the second presentation channel; selecting at least one of the plurality of action prompts based on the first ranking; and causing the selected at least one of the plurality of action prompts to be displayed in a specialized user interface on a computing device of the first user via the first presentation channel for selection by the first user.

In some example embodiments, the corresponding criteria for each one of the plurality of action prompts comprises a minimum threshold of similarity between the first set of one or more attributes and the second set of one or more attributes.

In some example embodiments, the first set of one or more attributes and the second set of one or more attributes each comprise at least one of work experience, education, skills, geographical location, and interests.

In some example embodiments, the first presentation channel comprises one of a profile page of the second user, a feed of the first user, and an e-mail message to an e-mail account of the first user, and the second presentation channel comprises another one of the profile page of the second user, the feed of the first user and the e-mail message to the e-mail account of the first user.

In some example embodiments, the operations further comprise detecting the computing device of the first user accessing the first presentation channel, wherein the basing of the selecting of the at least one of the plurality of action prompts on the first ranking is based on the detecting of the computing device accessing the first presentation channel, and wherein the causing the selected at least one of the plurality of action prompts to be displayed on the computing device via the first presentation channel is based on the detecting of the computing device accessing the first presentation channel.

In some example embodiments, the plurality of action prompts comprise at least one of a selectable option to send a message to the second user, a selectable option to connect with the second user, a selectable option to endorse the second user, and a selectable option to share content with the second user.

In some example embodiments, the operations further comprise for each one of the selected at least one of the plurality of action prompts, determining whether the first user selected the corresponding selectable option within a predetermined time period, and using a machine learning algorithm to modify the first ranking model based on the determinations of whether the first user selected the corresponding selectable options for each one of the selected at least one of the plurality of action prompts.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
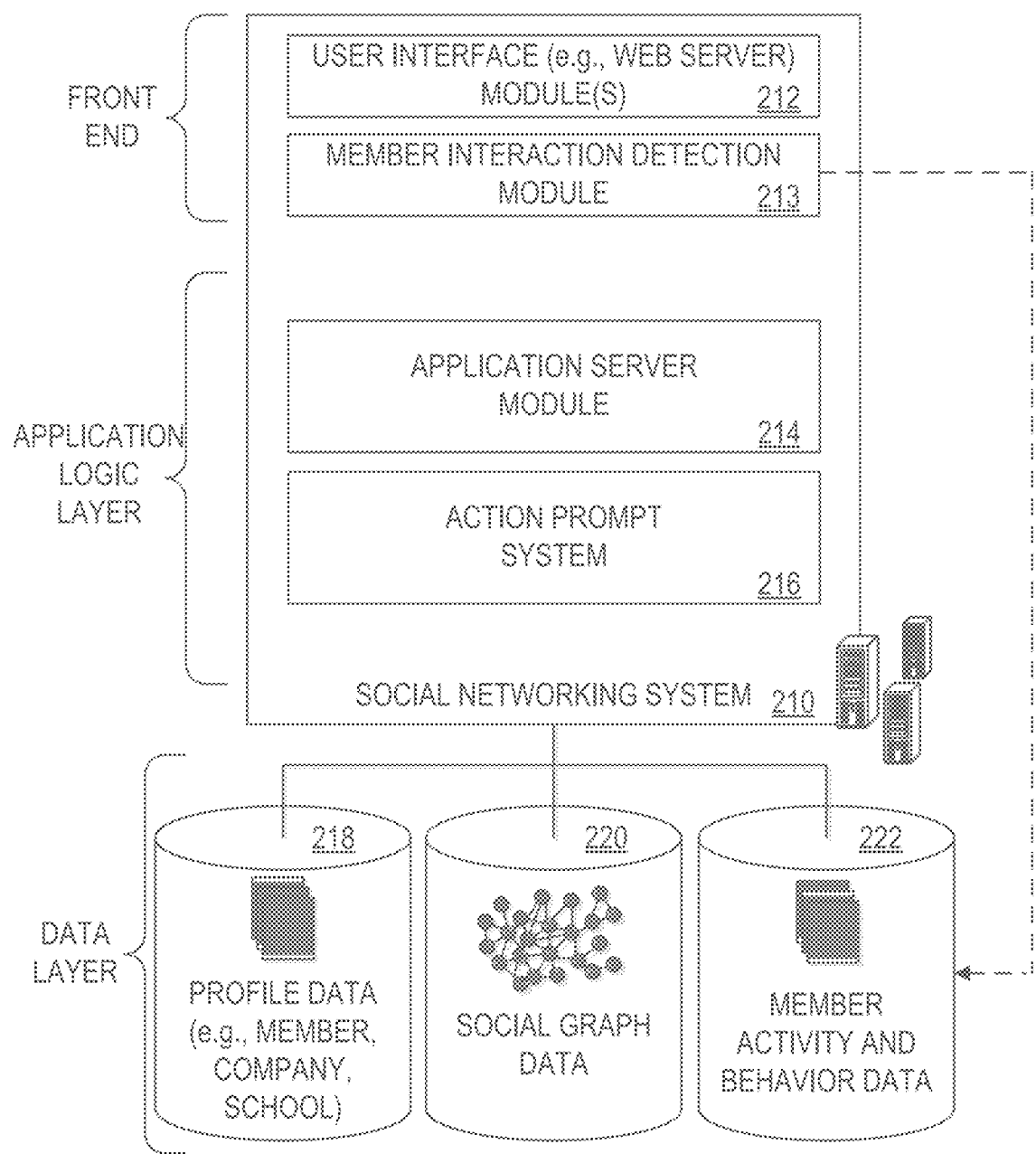
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as an action prompt system 216, for use in social networking system 210, consistent with some embodiments of the present disclosure. In some embodiments, the action prompt system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the action prompt system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the action prompt system 216.

In some embodiments, databases 218, 220, and 222 may be incorporated into database(s) 126 in FIG. 1. However, other configurations are also within the scope of the present disclosure.

In some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the action prompt system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
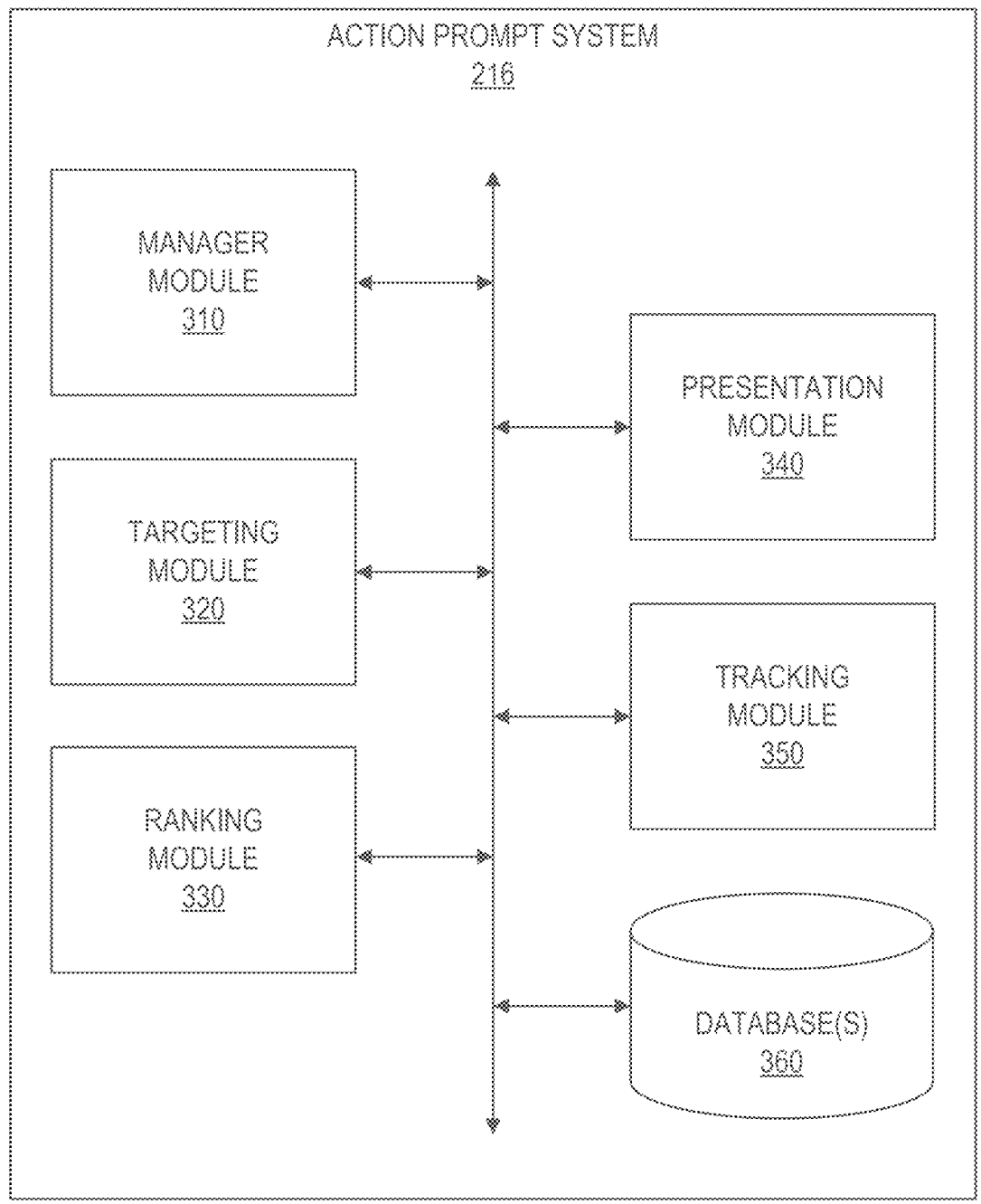
FIG. 3 is a block diagram illustrating components of an action prompt system, in accordance with an example embodiment.

FIG. 3 is a block diagram illustrating components of the action prompt system 216, in accordance with an example embodiment. In some embodiments, the action prompt system 216 comprises any combination of one or more of a manager module 310, a targeting module 320, a ranking module 330, a presentation module 340, a tracking module 350, and one or more database(s) 360. The modules 310, 320, 330, 340, and 350 and the database(s) 360 can reside on a computer system, or other machine, having a memory and at least one processor (not shown). In some embodiments, the modules 310, 320, 330, 340, and 350 and the database(s) 360 can be incorporated into the application server(s) 118 in FIG. 1. In some example embodiments, the database(s) 360 is incorporated into database(s) 126 in FIG. 1 and can include any combination of one or more of databases 218, 220, and 222 in FIG. 2. However, it is contemplated that other configurations of the modules 310, 320, 330, 340, and 350, as well as the database(s) 360, are also within the scope of the present disclosure.

In some example embodiments, one or more of the modules 310, 320, 330, 340, and 350 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, 340, and 350 is configured to receive user input. For example, one or more of the modules 310, 320, 330, 340, and 350 can present one or more GUI elements (e.g., drop-down menu, selectable buttons, text field) with which a user can submit input.

In some example embodiments, one or more of the modules 310, 320, 330, 340, and 350 is configured to perform various communication functions to facilitate the functionality described herein, such as by communicating with the social networking system 210 via the network 104 using a wired or wireless connection. Any combination of one or more of the modules 310, 320, 330, 340, and 350 may also provide various web services or functions, such as retrieving information from the third party servers 130 and the social networking system 210. Information retrieved by the any of the modules 310, 320, 330, 340, and 350 may include profile data corresponding to users and members of the social networking service of the social networking system 210.

Additionally, any combination of one or more of the modules 310, 320, 330, 340, and 350 can provide various data functionality, such as exchanging information with database(s) 360 or servers. For example, any of the modules 310, 320, 330, 340, and 350 can access member profiles that include profile data from the database(s) 360, as well as extract attributes and/or characteristics from the profile data of member profiles. Furthermore, the one or more of the modules 310, 320, 330, 340, and 350 can access social graph data and member activity and behavior data from database(s) 360, as well as exchange information with third party servers 130, client machines 110, 112, and other sources of information.

In some example embodiments, the manager module 310 is configured to receive specifications for action prompts from a computing device of an administrative user of the social networking service. An action prompt comprises digital content configured to prompt a user who is the target of the action prompt to perform an action. The specification of an action prompt comprises the digital content, including an indication of one or more selectable options, such as selectable user interface elements, that are configured to trigger the performance of the corresponding action when activated (e.g., clicked, tapped, or otherwise selected). An administrative user of the social networking service may submit specifications for actions prompts via a graphical user interface presented by the manager module 310. However, it is contemplated that the administrative user may also submit specifications for action prompts to the manager module 310 in other ways as well, such as by uploading files of code.

In some example embodiments, each specification for an action prompt also comprises criteria to be satisfied in order for the action prompt to be displayed, or otherwise presented, to a user of the social networking service. In some example embodiments, the corresponding criteria for each one of the plurality of action prompts comprises a minimum threshold of similarity between attributes of one user and attributes of another user. These attributes may comprise profile attributes. For example, a set of criteria for an action prompt that is configured to prompt a first user to connect with a second user may comprise a requirement that the first user and the second user attended the same school and work at the same company. Other action prompts and other criteria are also within the scope of the present disclosure. The specifications for the action prompts, including the corresponding criteria, may be stored in the database(s) 360 for subsequent access and use by the action prompt system 216. In some example embodiments, the criteria is set by the administrative user, or another user, via one or more user interface elements displayed on a computing device. For example, the administrative user may submit input specifying that the criteria comprises a requirement that the first user and the second user attended the same school and work at the same company. In some example embodiments, the action prompt system 216 retrieves data indicating how users have responded to selectable options that were selected based on different criteria, such as, for each user that was presented the selectable options, whether or not the user selected the selectable option, and then uses a machine learning algorithm to set or modify criteria based on the retrieved data. For example, the action prompt system 216 may determine that certain criteria is more likely to result in selectable options that are more likely to be selected by users, whereas other criteria is more likely to result in selectable options that are less likely to be selected by users. The action prompt 216 may determine or modify criteria based on such analysis, favoring criteria that is more likely to result in a user selecting a selectable option.

In some example embodiments, the action prompts comprise one or more of a selectable option to send a message to another member, a selectable option to connect with the other member, a selectable option to endorse the other member, and a selectable option to recommend content to the other member. However, other types of action prompts are also within the scope of the present disclosure.

Figure 4:
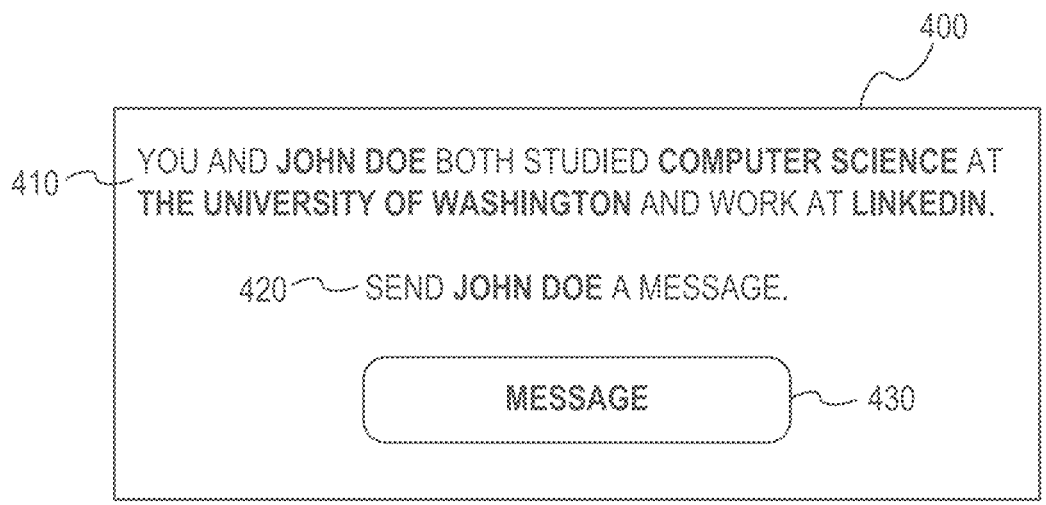
FIG. 4 illustrates an action prompt that may be displayed in a graphical user interface (GUI) of a computing device, in accordance with an example embodiment.

FIG. 4 illustrates an action prompt 400 that may be displayed in a graphical user interface (GUI) of a computing device, in accordance with an example embodiment. Action prompt 400 comprises an explanation 410 of why the action prompt 400 is being displayed to the user of the computing device. For example, the explanation 410 may indicate the corresponding criteria of the action prompt, such as an indication of the similarity between attributes of the user to whom the action prompt is displayed and another user to whom the action prompt is suggesting the user direct an action (e.g., "YOU AND JOHN DOE BOTH STUDIED COMPUTER SCIENCE AT THE UNIVERSITY OF WASHINGTON AND WORK AT LINKEDIN"). The action prompt 400 also comprises an instruction 420 for the user to perform the action directed towards the other user (e.g., "SEND JOHN DOE A MESSAGE") and a selectable option 430 to send a message to the other user. The selectable option 430 is configured to trigger the action prompt system 216 to perform a process of generating a message from the user to the other user in response to the user selecting (e.g., clicking, tapping) the selectable option 430. For example, in response to the user selecting the selectable option 430, the action prompt system 216 may generate a new message automatically addressed to the other user and allow the user to enter text (e.g., via a text field) and add content to the message (e.g., via selectable user interface elements).

Figure 5:
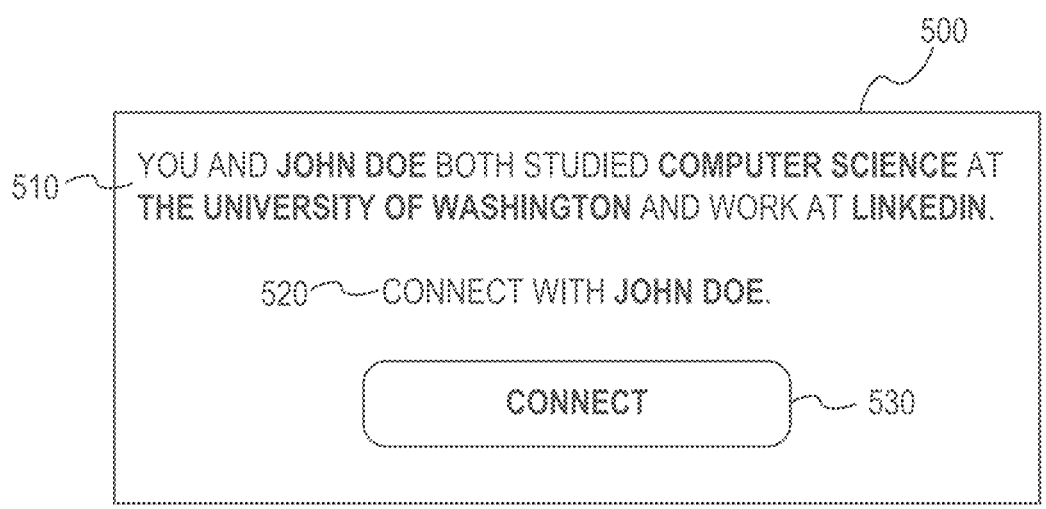
FIG. 5 illustrates another action prompt that may be displayed in a GUI of a computing device, in accordance with an example embodiment.

FIG. 5 illustrates another action prompt 500 that may be displayed in a GUI of a computing device, in accordance with an example embodiment. Action prompt 500 comprises an explanation 510 of why the action prompt 500 is being displayed to the user of the computing device. For example, the explanation 510 may indicate the corresponding criteria of the action prompt, such as an indication of the similarity between attributes of the user to whom the action prompt is displayed and another user to whom the action prompt is suggesting the user direct an action, similar to the explanation 410 in FIG. 4. The action prompt 500 also comprises an instruction 520 for the user to perform the action directed towards the other user (e.g., "CONNECT WITH JOHN DOE") and a selectable option 530 to connect with the other user. The selectable option 530 is configured to trigger the action prompt system 216 to connect the user with the other user or send an invitation to the other user to connect with the user in response to the user selecting (e.g., clicking, tapping) the selectable option 530.

Figure 6:
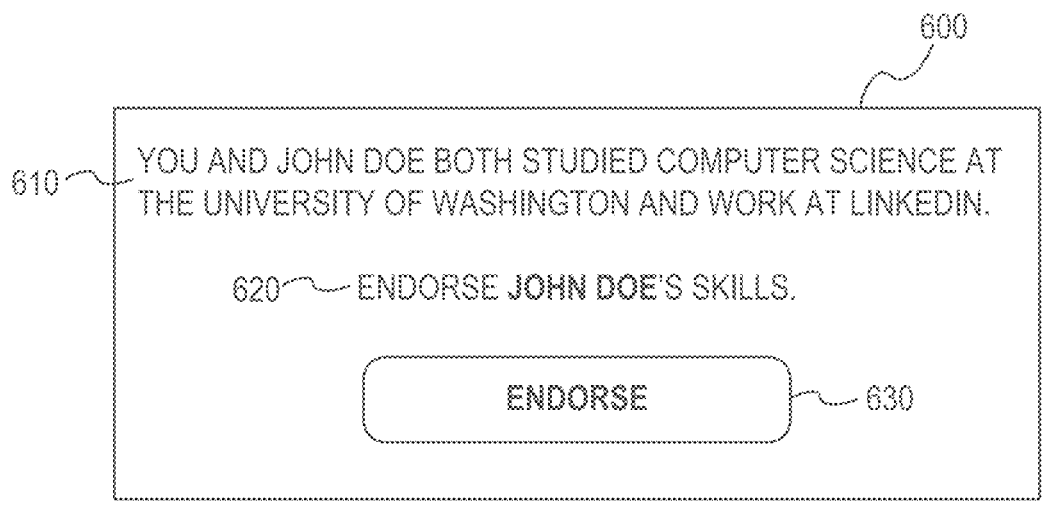
FIG. 6 illustrates yet another action prompt that may be displayed in a GUI of a computing device, in accordance with an example embodiment.

FIG. 6 illustrates yet another action prompt 600 that may be displayed in a GUI of a computing device, in accordance with an example embodiment. Action prompt 600 comprises an explanation 610 of why the action prompt 600 is being displayed to the user of the computing device. For example, the explanation 610 may indicate the corresponding criteria of the action prompt, such as an indication of the similarity between attributes of the user to whom the action prompt is displayed and another user with whom the action prompt is suggesting the user direct an action, similar to the explanation 410 in FIG. 4. The action prompt 600 also comprises an instruction 620 for the user to perform the action directed towards the other user (e.g., "ENDORSE JOHN DOE'S SKILLS") and a selectable option 630 to endorse the other user. The selectable option 630 is configured to trigger the action prompt system 216 to implement an endorsement of the other user by the user or to generate a page in which the user can select or otherwise indicate skills of the other user to endorse in response to the user selecting (e.g., clicking, tapping) the selectable option 630.

Figure 7:
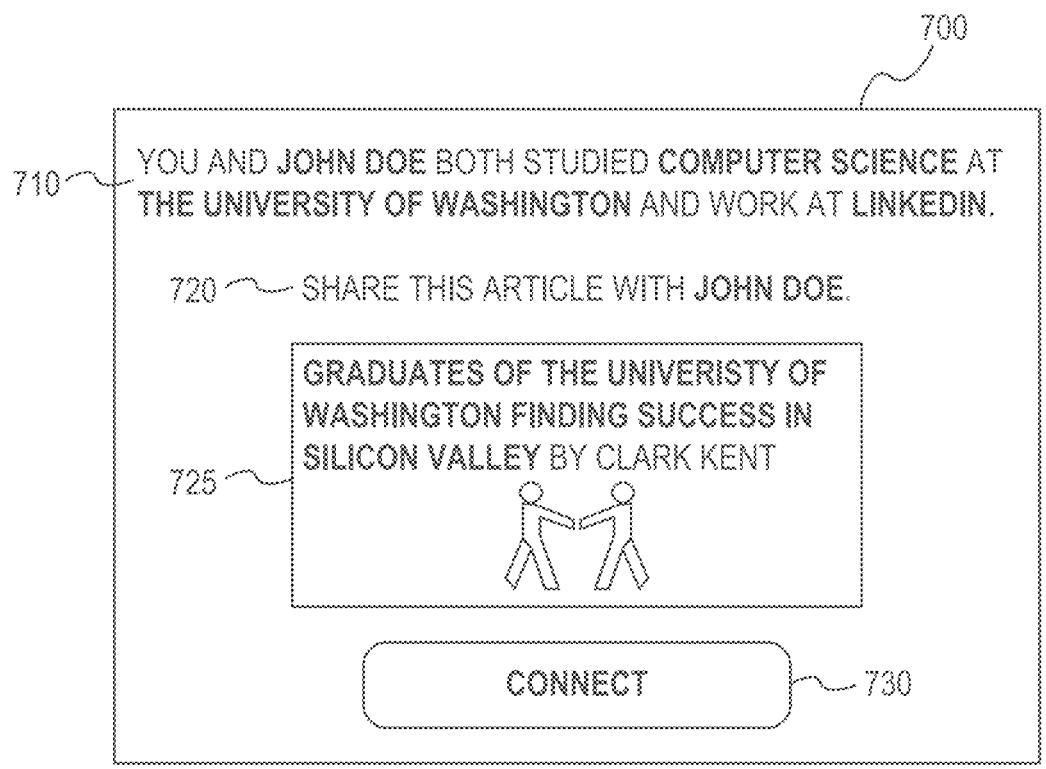
FIG. 7 illustrates yet another action prompt that may be displayed in a GUI of a computing device, in accordance with an example embodiment.

FIG. 7 illustrates yet another action prompt 700 that may be displayed in a GUI of a computing device, in accordance with an example embodiment. Action prompt 700 comprises an explanation 710 of why the action prompt 700 is being displayed to the user of the computing device. For example, the explanation 710 may indicate the corresponding criteria of the action prompt, such as an indication of the similarity between attributes of the user to whom the action prompt is displayed and another user to whom the action prompt is suggesting the user direct an action, similar to the explanation 410 in FIG. 4. The action prompt 700 also comprises an instruction 720 for the user to perform the action directed towards the other user (e.g., "SHARE THIS ARTICLE WITH JOHN DOE") and a selectable option 730 to share identified content 725, such as an article, with the other user. The selectable option 730 is configured to trigger the action prompt system 216 to implement a sharing of the identified content 725 by the user with the other user in response to the user selecting (e.g., clicking, tapping) the selectable option 730.

In some example embodiments, the targeting module 320 is configured to select, identify, or otherwise determine, one or more action prompts from the action prompts stored in the database(s) 360 based on the one or more action prompts having criteria satisfied by attributes of the user and attributes of another user to whom an action corresponding to the selectable option of each action prompt is to be directed. In some example embodiments, the targeting module 320 is configured to determine a first set of one or more attributes of a first profile of a first user of a social networking service, and to determine a second set of one or more attributes of a second profile of a second user of the social networking service. The targeting module 320 may access and retrieve the attributes from the profile data of the users stored in the database 218. In some example embodiments, the attributes comprise at least one of work experience, education, skills, geographical location, and interests. However, other attributes are also within the scope of the present disclosure.

In some example embodiments, the targeting module 320 is configured to select a plurality of action prompts from a database of action prompts (e.g., database(s) 360) based on, for each one of the plurality of action prompts, corresponding criteria of the action prompt being satisfied by the first set of one or more attributes of the first user and the second set of one or more attributes for the second user. The corresponding criteria for each one of the plurality of action prompts may comprise a minimum threshold of similarity between attributes of one user and attributes of another user. For example, one action prompt for prompting the first user to connect with the second user may comprise criteria requiring that the first user have particular attributes that are the same or sufficiently similar to the attributes of the second user, such as a requirement that the first user and the second user have work experience that is determined to meet a similarity threshold (e.g., at least one position in the same occupational field), a requirement that the first user and the second user graduated from the same university, a requirement that the first user and the second user are located in the same county or geographical region, or a requirement that the first user and the second user have at least three common interests identified in their respective profiles. The minimum threshold of similarity may comprise a specific minimum number of attributes that the users must have in common (e.g., at least three of the same attributes) or a specific set of attributes that the users must have in common (e.g., the users need to have worked in the same industry, in the same state, and have at least two common interests). Other minimum thresholds of similarity, as well as other types of criteria, may also be employed and are within the scope of the present disclosure.

In some example embodiments, the targeting module 320 is configured to select the plurality of action prompts from the database of action prompts in response to, or otherwise based on, a detection of a computing device of the first user accessing a particular presentation channel. A presentation channel comprises a page or mechanism in which content of the social networking service is presented to users of the social networking service. Examples of presentation channels include, but are not limited to, a profile page of a user, a home page of a user, a feed of a user, and an e-mail message residing in an e-mail account of a user. Other types of presentation channels are also within the scope of the present disclosure. In one example, the targeting module 320 is configured to select the plurality of action prompts from the database of action prompts in response to, or otherwise based on, a detection of a computing device of the first user accessing (e.g., viewing or navigating to) a profile page of the second user. In another example, the targeting module 320 is configured to select the plurality of action prompts from the database of action prompts in response to, or otherwise based on, a detection of a computing device of the first user accessing (e.g., viewing or navigating to) a home page of the first user. In yet another example, the targeting module 320 is configured to select the plurality of action prompts from the database of action prompts in response to, or otherwise based on, a detection of a computing device of the first user accessing (e.g., viewing or navigating to) an e-mail message sent to the e-mail account of the first user.

In some example embodiments, the ranking module 330 is configured to generate different rankings of the plurality of action prompts for different presentation channels based on different ranking models for the different presentation channel. For example, in some example embodiments, the ranking model 330 is configured to generate a first ranking of the plurality of action prompts for a first presentation channel based on a first ranking model for the first presentation channel, and to generate a second ranking of the plurality of action prompts for a second presentation channel based on a second ranking model for the second presentation channel. A ranking model for a particular presentation channel may comprise a function or specification configured to determine a ranking for a given set of action prompts for that particular presentation channel, and another ranking model for another particular presentation channel may comprise another function or specification configured to determine another ranking for the same set of action prompts for that other particular presentation channel. In some example embodiments, each ranking model specifies the order in which action prompts are to be ranked for the corresponding presentation channel. For example, a ranking model for a profile page presentation channel may specify the following ranking for action prompts:

1. An action prompt having a selectable option to send a message to another user.
2. An action prompt having a selectable option to share content with another user.
3. An action prompt having a selectable option to endorse another user.
4. An action prompt having a selectable option to connect with another user.

A ranking model for a home page presentation channel may specify the following ranking for action prompts:

1. An action prompt having a selectable option to share content with another user.
2. An action prompt having a selectable option to send a message to another user.
3. An action prompt having a selectable option to endorse another user.
4. An action prompt having a selectable option to connect with another user.

A ranking model for a feed of a user may specify the following ranking for action prompts:

1. An action prompt having a selectable option to endorse another user.
2. An action prompt having a selectable option to share content with another user.
3. An action prompt having a selectable option to connect with another user.
4. An action prompt having a selectable option to send a message to another user.

A ranking model for an e-mail message residing in an e-mail account of a user may specify the following ranking for action prompts:

1. An action prompt having a selectable option to connect with another user.
2. An action prompt having a selectable option to share content with another user.
3. An action prompt having a selectable option to endorse another user.
4. An action prompt having a selectable option to send a message to another user.

Other configurations of the different ranking models for the different presentation channels may also be employed and are within the scope of the present disclosure.

In addition or as an alternative to a ranking model specifying a strict ranking for action prompts, in some example embodiments, one or more of the different ranking models are also configured to base a ranking of the action prompts on one or more attributes of a first user and/or one or more attributes of a second user. For example, the ranking module 330 may use a specified order, such as one of the example specified rankings above, as base or initial ranking, and then adjust the ranking based on one or more attributes of the first user or one or more attributes of the second user or both. In some example embodiments, a degree of similarity between common attributes of the first user and attributes of the second user are used to adjust the initial ranking. In one example, the fact the first user and the second user both have the same exact job (e.g., both users are patent attorneys) as opposed to both users having similar jobs (e.g., the first user is a patent attorney and the second user is a family law attorney) can be used as a basis for adjusting the ranking.

In some example embodiments, the presentation module 340 is configured to select one of the presentation channels to use in presenting one or more action prompts to a user, and then select at least one of the plurality of action prompts based on the ranking for that selected presentation channel. In some example embodiments, the presentation module 340 is configured to detect a computing device of the user accessing one of the presentation channels (e.g., the user viewing a profile page of another user), and the presentation module 340 selects the presentation channel to use in presenting the action prompt(s) in response to, or otherwise based on, the detection of the computing device of the user accessing that presentation channel.

In some example embodiments, the presentation module 340 is configured to cause the selected action prompt(s) to be displayed on the computing device of the user via the selected presentation channel in response to, or otherwise based on, the detection of the computing device of the user accessing that presentation channel. The presentation module 340 may select one or more of the top-ranked action prompts, such as the highest-ranked action prompt or the two highest-ranked action prompts or the N highest-ranked action prompts, where N is a positive integer.

FIG. 8 illustrates a GUI 800 in which the action prompt 500 is displayed on a profile page of a user of a social networking service, in accordance with an example embodiment. The action prompt 500 may be displayed on the profile page of the user in response to, or otherwise based on, a detection of a computing device another user accessing that profile page.

Figure 9:
FIG. 9 illustrates a GUI in which an action prompt is displayed on a home page of a user of a social networking service, in accordance with an example embodiment.

FIG. 9 illustrates a GUI 900 in which the action prompt 400 is displayed on a home page of a user of a social networking service, in accordance with an example embodiment. The action prompt 400 may be displayed on the home page of the user in response to, or otherwise based on, a detection of a computing device of the user accessing that home page.

Although the action prompts 500 and 400 in FIGS. 8 and 9 are illustrated as being displayed overlaying other digital content on the profile page and the home page, respectively, in some example embodiments, the action prompts are inserted directly into the digital content of the page, such as part of the feed for the page.

In some example embodiments, the tracking module 350 is configured to determine, for each one of the action prompts, whether the user to whom the action prompt was presented selected the corresponding selectable option of the action prompt within a predetermined time period (e.g., within 24 hours of the action prompt being presented to the user). The tracking module 350 may store a history of which action prompts the user responds to (e.g., selects the corresponding selectable option) and which action prompts the user does not respond to, and then use a machine learning algorithm to modify the ranking model that was used in presenting those action prompts based on that history of user action and inaction with respect to those action prompts.

Figure 10:
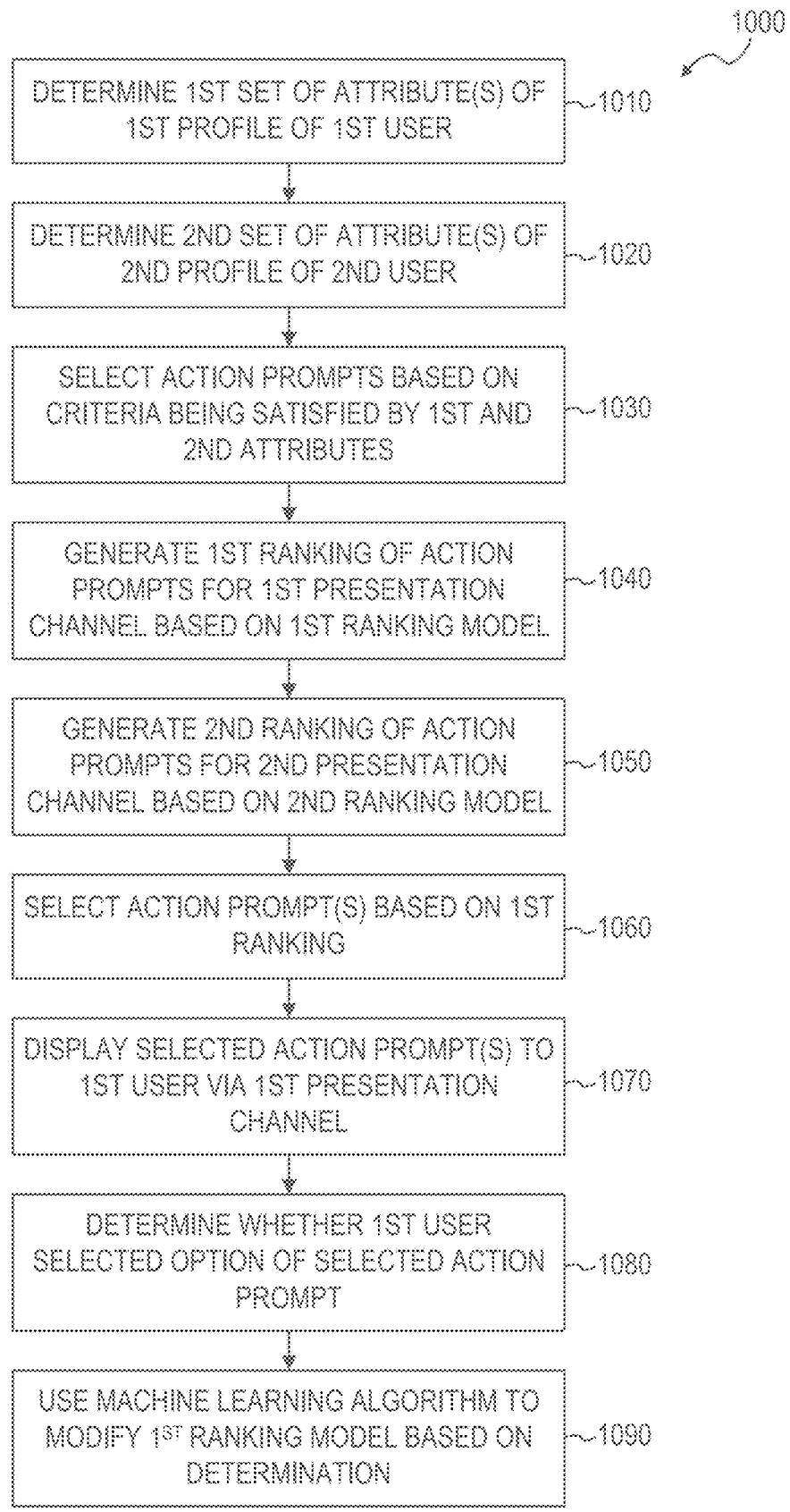
FIG. 10 is a flowchart illustrating a method of generating action prompts based on attribute affinity between different users of a social networking service, in accordance with an example embodiment.

FIG. 10 is a flowchart illustrating a method 1000 of generating action prompts based on attribute affinity between different users of a social networking service, in accordance with an example embodiment. Method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the action prompt system 216 of FIGS. 2-3, or any combination of one or more of its modules, as described above.

At operation 1010, the action prompt system 216 determines a first set of one or more attributes of a first profile of a first user of a social networking service. At operation 1020, the action prompt system 216 determines a second set of one or more attributes of a second profile of a second user of the social networking service. In some example embodiments, the first set of one or more attributes and the second set of one or more attributes each comprise at least one of work experience, education, skills, geographical location, and interests.

At operation 1030, the action prompt system 216 selects a plurality of action prompts from a database of action prompts based on, for each one of the plurality of action prompts, corresponding criteria of the action prompt being satisfied by the first set of one or more attributes and the second set of one or more attributes, with each one of the plurality of actions prompts comprising a selectable option for the first user to interact with the second member via the social networking service. In some example embodiments, the corresponding criteria for each one of the plurality of action prompts comprises a minimum threshold of similarity between the first set of one or more attributes and the second set of one or more attributes. In some example embodiments, the plurality of action prompts comprise at least one of a selectable option to send a message to the second member, a selectable option to connect with the second member, a selectable option to endorse the second member, and a selectable option to recommend content to the second member.

At operation 1040, the action prompt system 216 generates a first ranking of the plurality of action prompts for a first presentation channel based on a first ranking model for the first presentation channel. At operation 1050, the action prompt system 216 generates a second ranking of the plurality of action prompts for a second presentation channel based on a second ranking model for the second presentation channel. In some example embodiments, the first presentation channel comprises one of a profile page of the second member, a feed of the first member, and an e-mail message to an e-mail account of the first member, and the second presentation channel comprises another one of the profile page of the second member, the feed of the first member and the e-mail message to the e-mail account of the first member.

At operation 1060, the action prompt system 216 selects at least one of the plurality of action prompts based on the first ranking. At operation 1070, the action prompt system 216 causes the selected at least one of the plurality of action prompts to be displayed on a computing device of the first member via the first presentation channel. In some example embodiments, the action prompt system 216 detects the computing device of the first user accessing the first presentation channel, and the selecting of the at least one of the plurality of action prompts on the first ranking is in response to, or otherwise based on, the detecting of the computing device accessing the first presentation channel, and the causing the selected at least one of the plurality of action prompts to be displayed on the computing device via the first presentation channel is in response to, or otherwise based on, the detecting of the computing device accessing the first presentation channel.

At operation 1080, the action prompt system 216, for each one of the selected at least one of the plurality of action prompts, determines whether the first user selected the corresponding selectable option within a predetermined time period. At operation 1090, the action prompt system 216 uses a machine learning algorithm to modify the first ranking model based on the determinations of whether the first user selected the corresponding selectable options for each one of the selected at least one of the plurality of action prompts.

It is contemplated that any of the other features described within the present disclosure can be incorporated into method 1000.

Example Mobile Device

Figure 11:
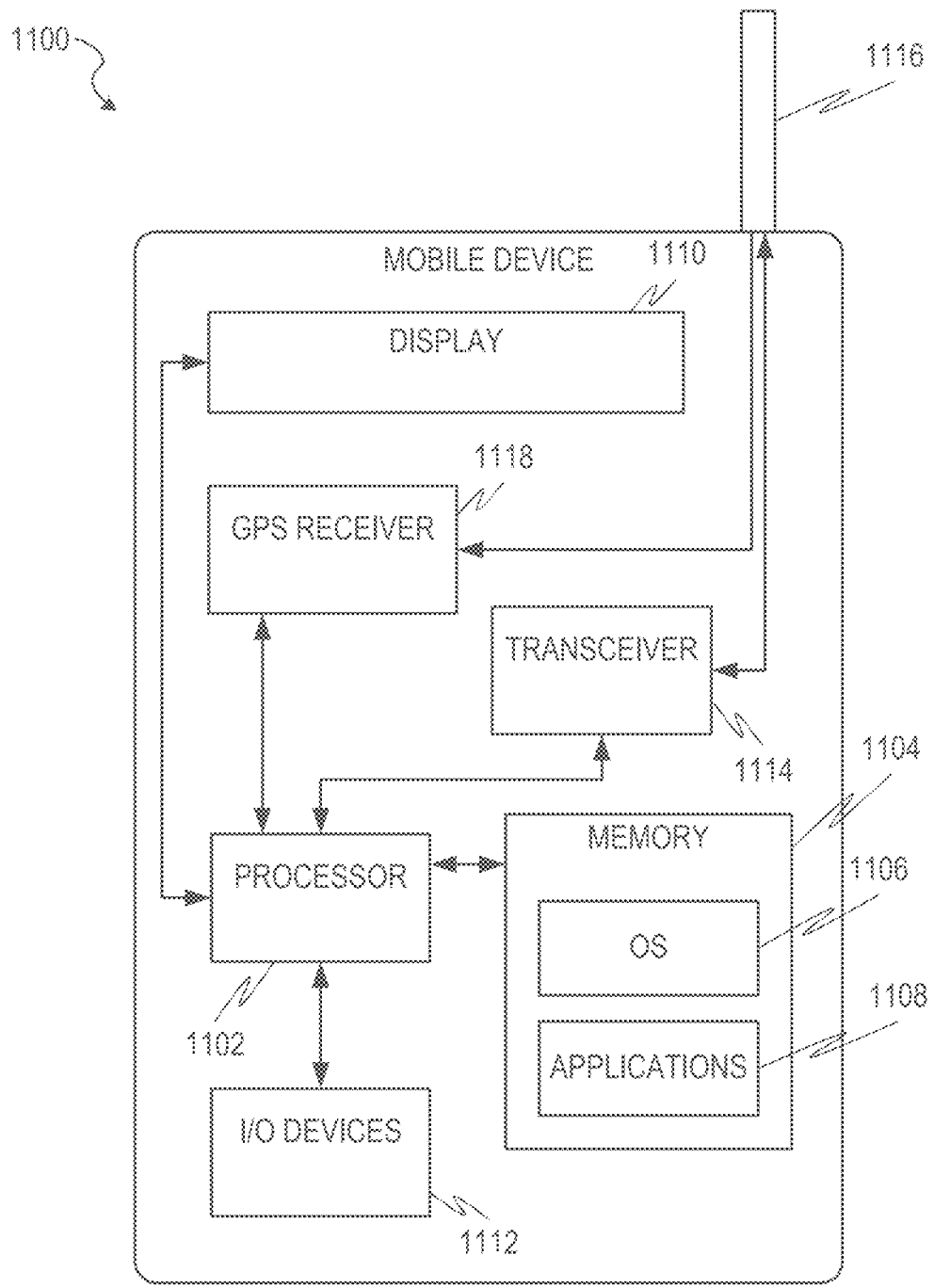
FIG. 11 is a block diagram illustrating a mobile device, in accordance with some example embodiments.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location-enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
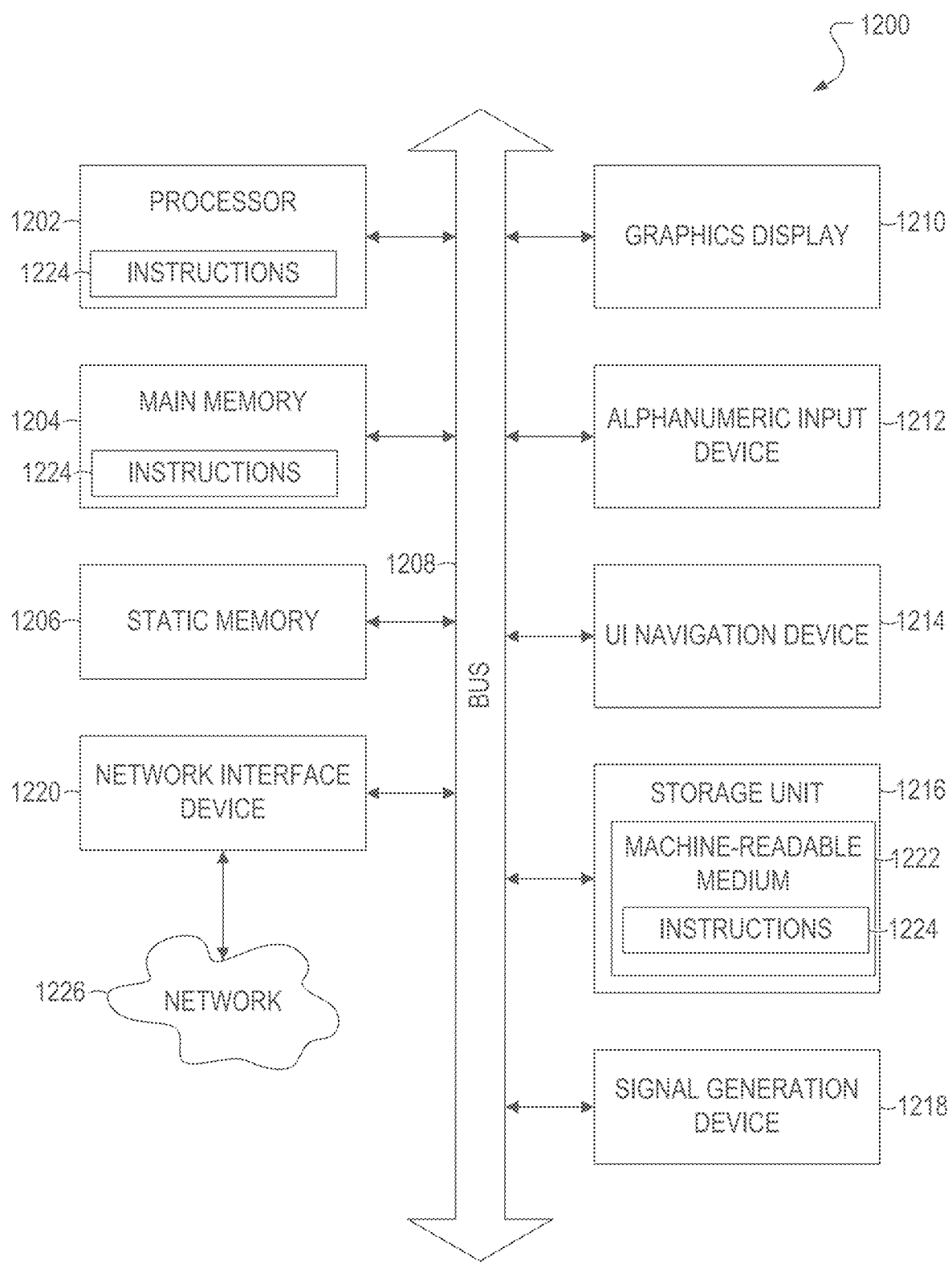
FIG. 12 is a block diagram of an example computer system on which methodologies described herein may be executed, in accordance with an example embodiment.

FIG. 12 is a block diagram of an example computer system 1200 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a graphics display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a storage unit 1216, a signal generation device 1218 (e.g., a speaker) and a network interface device 1220.

Machine-Readable Medium

The storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions (e.g., instructions 1224) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   determining, by a computer system having at least one hardware processor, a first set of one or more attributes of a first profile of a first user of a social networking service;
   determining, by the computer system, a second set of one or more attributes of a second profile of a second user of the social networking service;
   selecting, by the computer system, a plurality of action prompts from a database of action prompts based on, for each one of the plurality of action prompts, corresponding criteria of the action prompt being satisfied by the first set of one or more attributes and the second set of one or more attributes, each one of the plurality of actions prompts comprising a selectable option for the first user to interact with the second user via the social networking service;

generating, by the computer system, a first ranking of the plurality of action prompts for a first presentation channel based on a first ranking model for the first presentation channel, the first presentation channel being one of a profile page of the second user; a feed of the first user, or an e-mail message to an e-mail account of the first user;

generating, by the computer system, a second ranking of the plurality of action prompts for a second presentation channel based on a second ranking model for the second presentation channel, the second ranking of the plurality of action prompts being different from the first ranking of the plurality of action prompts, the second presentation channel being different from the first presentation channel and being another one of the profile page of the second user, the feed of the first user, or the e-mail message to the e-mail account of the first user, and the second ranking model being different from the first ranking model;

selecting, by the computer system, the first presentation channel for use in presenting action prompt content to the first user;

selecting, by the computer system, at least one of the plurality of action prompts using the first ranking, the first ranking being used to select the at least one of the plurality of action prompts based on the selecting of the first presentation channel for use in presenting action prompt content to the first user;

causing, by the computer system, the selected at least one of the plurality of action prompts to be displayed on a computing device of the first user via the first presentation channel;

selecting, by the computer system, the second presentation channel for use in presenting action prompt content to the first user;

selecting, by the computer system, at least another one of the plurality of action prompts using the second ranking, the second ranking being used to select the at least another one of the plurality of action prompts based on the selecting of the second presentation channel for use in presenting action prompt content to the first user; and causing, by the computer system, the selected at least another one of the plurality of action prompts to be displayed on the computing device of the first user via the second presentation channel.

2. The computer-implemented method of claim 1, wherein the corresponding criteria for each one of the plurality of action prompts comprises a minimum threshold of similarity between the first set of one or more attributes and the second set of one or more attributes.

3. The computer-implemented method of claim 1, wherein the first set of one or more attributes and the second set of one or more attributes each comprise at least one of work experience, education, skills, geographical location, and interests.

4. The computer-implemented method of claim 1, further comprising:
   detecting, by the computer system, the computing device of the first user accessing the first presentation channel, wherein the selecting of the at least one of the plurality of action prompts using the first ranking is based on detecting the computing device accessing the first presentation channel, and
   wherein the causing the selected at least one of the plurality of action prompts to be displayed on the computing device via the first presentation channel is based on the detecting of the computing device accessing the first presentation channel.

5. The computer-implemented method of claim 1, wherein the plurality of action prompts comprise at least one of a selectable option to send a message to the second user, a selectable option to connect with the second user, a selectable option to endorse the second user, and a selectable option to share content with the second user.

6. The computer-implemented method of claim 1, further comprising:
   for each one of the selected at least one of the plurality of action prompts, determining, by the computer system, whether the first user selected the corresponding selectable option within a predetermined time period; and
   using, by the computer system, a machine learning algorithm to modify the first ranking model based on the determination of whether the first user selected the corresponding selectable options for each one of the selected at least one of the plurality of action prompts.

7. A system comprising:
   at least one hardware processor; and
   a non-transitory machine-readable medium embodying a set of instructions that, when executed by the at least one hardware processor, cause the at least one processor to perform operations, the operations comprising:
      identifying a first set of one or more attributes of a first profile of a first user of a social networking service;
      identifying a second set of one or more attributes of a second profile of a second user of the social networking service;
      selecting a plurality of action prompts from a database of action prompts based on, for each one of the plurality of action prompts, corresponding criteria of the action prompt being satisfied by the first set of one or more attributes and the second set of one or more attributes, each one of the plurality of actions prompts comprising a selectable option for the first user to interact with the second user via the social networking service;
      determining a first ranking of the plurality of action prompts for a first presentation channel based on a first ranking model for the first presentation channel, the first presentation channel being one of a profile page of the second user, a feed of the first user, or an e-mail message to an e-mail account of the first user;
      determining a second ranking of the plurality of action prompts for a second presentation channel based on a second ranking model for the second presentation channel, the second ranking of the plurality of action prompts being different from the first ranking of the plurality of action prompts, the second presentation channel being different from the first presentation channel and being another one of the profile page of the second user; the feed of the first user, or the e-mail message to the e-mail account of the first user, and the second ranking model being different from the first ranking model;
      selecting the first presentation channel for use in presenting action prompt content to the first user;
      selecting at least one of the plurality of action prompts using the first ranking, the first ranking being used to select the at least one of the plurality of action prompts based on the selecting of the first presentation channel for use in presenting action prompt content to the first user;
causing the selected at least one of the plurality of action prompts to be displayed on a computing device of the first user via the first presentation channel;
selecting the second presentation channel for use in presenting action prompt content to the first user;
selecting at least another one of the plurality of action prompts using the second ranking, the second ranking being used to select the at least another one of the plurality of action prompts based on the selecting of the second presentation channel for use in presenting action prompt content to the first user; and
causing the selected at least another one of the plurality of action prompts to be displayed on the computing device of the first user via the second presentation channel.

8. The system of claim 7, wherein the corresponding criteria for each one of the plurality of action prompts comprises a minimum threshold of similarity between the first set of one or more attributes and the second set of one or more attributes.

9. The system of claim 7, wherein the first set of one or more attributes and the second set of one or more attributes each comprise at least one of work experience, education, skills, geographical location, and interests.

10. The system of claim 7, wherein the operations further comprise:
detecting the computing device of the first user accessing the first presentation channel,
wherein the selecting of the at least one of the plurality of action prompts using the first ranking is based on detecting the computing device accessing the first presentation channel, and
wherein the causing the selected at least one of the plurality of action prompts to be displayed on the computing device via the first presentation channel is based on the detecting of the computing device accessing the first presentation channel.

11. The system of claim 7, wherein the plurality of action prompts comprise at least one of a selectable option to send a message to the second user, a selectable option to connect with the second user, a selectable option to endorse the second user, and a selectable option to share content with the second user.

12. The system of claim 7, wherein the operations further comprise:
for each one of the selected at least one of the plurality of action prompts, determining whether the first user selected the corresponding selectable option within a predetermined time period; and
using a machine learning algorithm to modify the first ranking model based on the determination of whether the first user selected the corresponding selectable options for each one of the selected at least one of the plurality of action prompts.

13. A non-transitory machine-readable medium embodying a set of instructions that, when executed by at least one hardware processor, cause the at least one hardware processor to perform operations, the operations comprising:
determining a first set of one or more attributes of a first profile of a first user of a social networking service;
determining a second set of one or more attributes of a second profile of a second user of the social networking service;
selecting a plurality of action prompts from a database of action prompts based on, for each one of the plurality of action prompts, corresponding criteria of the action prompt being satisfied by the first set of one or more attributes and the second set of one or more attributes, each one of the plurality of actions prompts comprising a selectable option for the first user to interact with the second user via the social networking service;
determining a first ranking of the plurality of action prompts for a first presentation channel based on a first ranking model for the first presentation channel, the first presentation channel being one of a profile page of the second user; a feed of the first user, or an e-mail message to an e-mail account of the first user;
determining a second ranking of the plurality of action prompts for a second presentation channel based on a second ranking model for the second presentation channel, the second ranking of the plurality of action prompts being different from the first ranking of the plurality of action prompts, the second presentation channel being different from the first presentation channel and being another one of the profile page of the second user, the feed of the first user, or the e-mail message to the e-mail account of the first user, and the second ranking model being different from the first ranking model;
selecting the first presentation channel for use in presenting action prompt content to the first user;
selecting at least one of the plurality of action prompts using the first ranking, the first ranking being used to select the at least one of the plurality of action prompts based on the selecting of the first presentation channel for use in presenting action prompt content to the first user;
causing the selected at least one of the plurality of action prompts to be displayed on a computing device of the first user via the first presentation channel;
selecting the second presentation channel for use in presenting action prompt content to the first user;
selecting at least another one of the plurality of action prompts using the second ranking, the second ranking being used to select the at least another one of the plurality of action prompts based on the selecting of the second presentation channel for use in presenting action prompt content to the first user; and
causing the selected at least another one of the plurality of action prompts to be displayed on the computing device of the first user via the second presentation channel.

14. The non-transitory machine-readable medium of claim 13, wherein the corresponding criteria for each one of the plurality of action prompts comprises a minimum threshold of similarity between the first set of one or more attributes and the second set of one or more attributes.

15. The non-transitory machine-readable medium of claim 13, wherein the operations further comprise:
detecting the computing device of the first user accessing the first presentation channel,
wherein the selecting of the at least one of the plurality of action prompts using the first ranking is based on detecting the computing device accessing the first presentation channel, and
wherein the causing the selected at least one of the plurality of action prompts to be displayed on the computing device via the first presentation channel is based on the detecting of the computing device accessing the first presentation channel.

16. The non-transitory machine-readable medium of claim 13, wherein the plurality, of action prompts comprise at least one of a selectable option to send a message to the second user, a selectable option to connect with the second user, a selectable option to endorse the second user, and a selectable option to share content with the second user.

17. The non-transitory machine-readable medium of claim 13, wherein the operations further comprise:
   for each one of the selected at least one of the plurality of action prompts, determining whether the first user selected the corresponding selectable option within a predetermined time period; and
   using a machine learning algorithm to modify the first ranking model based on the determination of whether the first user selected the corresponding selectable options for each one of the selected at least one of the plurality of action prompts.

18. The computer-implemented method of claim 1, wherein the causing the selected at least one of the plurality of action prompts to be displayed on the computing device of the first user via the first presentation channel comprises causing an explanation of why the selected at least one of the plurality of action prompts is being displayed on the computing device to be displayed on the computing device in association with the selected at least one of the plurality of action prompts, the explanation comprising an indication of similarity between the first set of one or more attributes of the first profile of the first user and the second set of one or more attributes of the second profile of the second user.

* * * * *